May 12, 1964  M. N. CROWE  3,132,949
PREPARATION OF PRE-COOKED FOOD PRODUCT
Filed July 17, 1961  2 Sheets-Sheet 1

INVENTOR.
Marvin N. Crowe
BY
ATTORNEYS

May 12, 1964 M. N. CROWE 3,132,949
PREPARATION OF PRE-COOKED FOOD PRODUCT
Filed July 17, 1961 2 Sheets-Sheet 2

INVENTOR.
Marvin N. Crowe
BY
ATTORNEYS

United States Patent Office 3,132,949
Patented May 12, 1964

3,132,949
PREPARATION OF PRE-COOKED FOOD PRODUCT
Marvin N. Crowe, 2075 S. Platte River Drive,
Denver 23, Colo.
Filed July 17, 1961, Ser. No. 124,573
13 Claims. (Cl. 99—100)

This invention relates to preparation of pre-cooked food products and more particularly to preparation of self-sustaining pieces of pre-cooked food product from discrete particles of milled grain.

It is the practice to manufacture pre-cooked food products from a wide variety of raw materials for use as hors d'oeuvres, embellishments for other foods and the like. One of the more common foods of this category is potato chips which are manufactured by deep frying thin slices of potatoes until a crisp product results. More recently other products offered have been bite size pieces of pre-cooked food manufactured from milled grain such as corn.

In the manufacture of a corn product it has been the practice to form a mush of discrete particles of milled corn and to partially cook them in order to form a porridge like mass. The resulting porridge like mass has been extruded through a plurality of thin apertures from which they are removed by a knife or doctor blade with the resulting segments of extruded material fried or cooked until a crisp product results. However, the cooked product which results is usually thick and has a tendency to be tough. Also the thicker pieces of product have a tendency to become stale, i.e., pick up moisture and become limp or soggy much faster than thinner chip products such as potato chips.

Accordingly it is an object of this invention to provide for preparation of pre-cooked food products; and particularly food products formed from milled grain.

Another object of the invention is to provide for manufacture of an improved pre-cooked food product prepared from milled grain, which resists deterioration or staleness, which is thin and crisp and gastronomically attractive.

It is still a further object of the invention to provide apparatus for the preparation of pre-cooked food products from milled grains and the like.

A further object of the invention is to provide apparatus and procedure for the manufacture of a pre-cooked food product from milled grain which product is thin and crisp and is particularly adapted for attractive packaging arrangements.

A further object of the invention is to provide apparatus for cooking food products manufactured from milled grain and to impart to them a thin, crisp characteristic and to further provide for the handling of such food products from an initial mush-like porridge stage to a final salting stage.

And it is still a further object of the invention to provide apparatus by which a corrugated or wavy surface configuration is imparted to pre-cooked chip-like food products, thereby providing greater apparent bulk when packaged.

Briefly, in one embodiment, an arrangement for preparing pre-cooked food products embodying my inventive concepts includes a plurality of successive material treatment stations. A whole grain such as corn is slightly cooked, then stone ground and masa results. "Masa" is a term of the art which is indicative of a pre-cooked corn mash. The masa is delivered to a feeding station which includes a hopper having a pair of oppositely rotating rollers positioned in the bottom theerof which are adapted to force feed the masa through a thin apertured plate. The rods of extruded masa passing through the apertures of the plate are continuously sliced by wire fingers to thereby provide thin increments of material. The thin increments drop from the slicing action onto a moving conveyor belt. The conveyor belt carries the sliced increments forwardly from the feeding station and into contact with an upper conveyor. A pair of rollers positioned on the non-conveying faces of the upper and lower conveyors are adapted to force said conveyors into close proximity thereby flattening the increments, frictionally engaging them, and thereafter carrying them through an elongated oven wherein they are partially cooked until of a flexible, rubber-like consistency. Adjacent the other end of the oven and associated with the respective upper and lower conveyors are cleaning rollers which are adapted to assure removal of the partially cooked rubber-like increments. These increments thereafter drop onto a downwardly sloping conveyor which is arranged to carry them into an elongated cooking tank. The cooking tank is filled with cooking oil and is adapted to finish the cooking of the increments. Mounted above the cooking tank and having a portion of its conveying arrangement slightly below the surface of the oil is a novel, flexible, woven wire cloth or belt. The wire belt is so attached to a link driving belt as to hang in a successive plurality of regular catenary curves. The rubbery articles which are delivered by the sloping conveyor into the oil bath tend to float due to their inherent buoyancy. When the increments so float they come in contact with the catenary curves formed in the wire cloth and conform in contour to these catenary curves. Conveying movement of the wire cloth carries the increments through the oil bath as well as causing constant mixing of the oil. Adjacent the bottom of the tank are a plurality of heaters which are adapted to maintain the oil bath at a desired cooking temperature. Since the heaters are on the bottom of the tank there is a tendency for the hotter oil to rise to the surface of the bath and mixing and flow is caused through the upper portion thereof by the wire belt.

At the end of the oil bath the thin increments are in a crisp, self-sustaining state in conforming relation to the catenary curves in the wire cloth. Occasionally these chips tend to stick or adhere to the wire cloth. However, since it is a flexible, cloth-like wire belt, as it passes around an end sheave or pulley it droops, as it were, between successive points of attachment, thereby disengaging the crisp chip product. The disassociated chips thereafter pass to another conveyor above which is positioned an apertured salting roller which applies salt to the chip product.

A further understanding of the invention and other objects and feautres thereof will be apparent from a study of the following detailed description with reference to the drawings in which like reference numerals are used to designate like parts in the several views. In these drawings.

Figure 1:
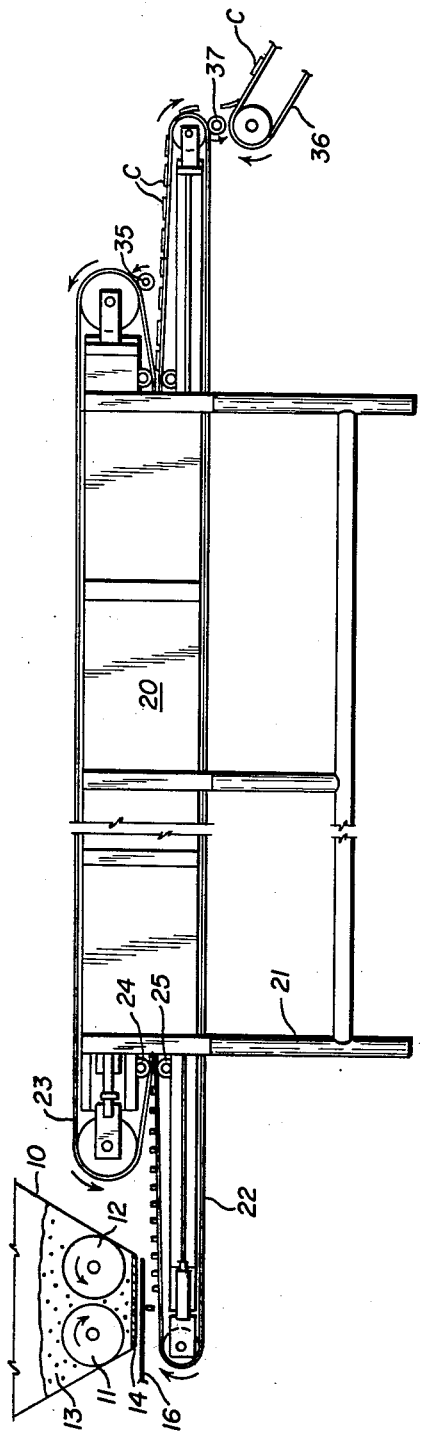
FIG. 1 is is a schematic side elevation of an initial feeding arrangement and first cooking stage in preparation of food products according to the invention.
Figures 2, 2A:
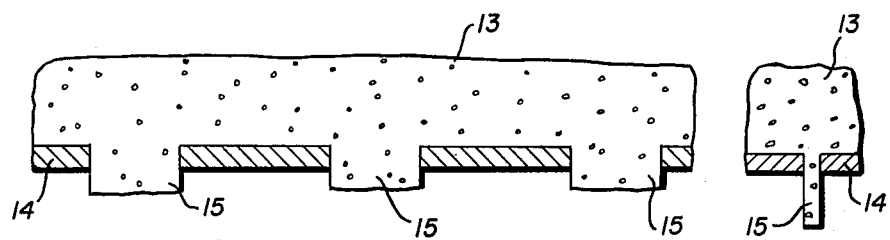
FIG. 2 is a fragmentary side elevation of an apertured plate included in the feeding arrangement of the apparatus of FIG. 1.
FIG. 2A is a fragmentary side elevation in partial section of the arrangement of FIG. 2.
Figure 3:
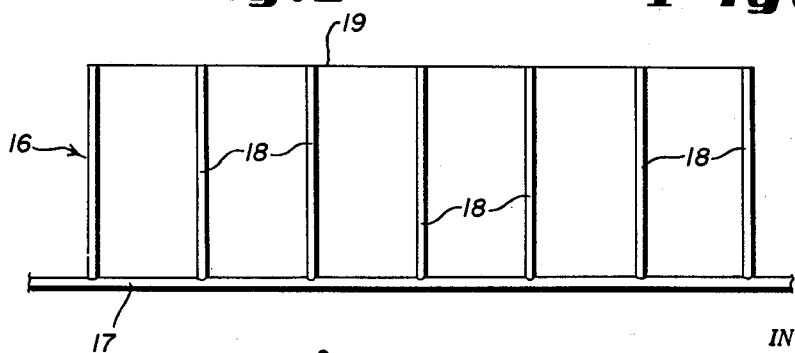
FIG. 3 is a fragmentary top view of wire fingers which slice thin increments from the material extruded through the apertured plate of FIG. 2.

Novel apparatus for preparation of pre-cooked food product according to my invention, in FIG. 1, includes a feed hopper or bin 10 having a pair of rollers 11 and 12 adapted to rotate in opposite directions towards the center of the hopper and to thereby force partially cooked masa 13 downwardly through the apertured plate 14. When masa is forced through the apertures in plate 14 (FIG. 2) a plurality of rods 15, FIG. 2, are formed. The slicing fingers 16 are adapted to continuously pass beneath the apertures in plate 14 and slice thin increments of the masa from the rods. The slicing member 16 (FIG. 3) is comprised of a control arm 17 having a plurality of spaced fingers 18 extending therefrom which are joined across their outermost ends by the forward wire like member 19. In operation the control arm 17 is caused to reciprocate substantially perpendicularly to the rod 16 by a suitable power source (not shown) such that forward wire like member 19 passes across all the apertures and in close proximity to the bottom of aperture plate 14 and slices thin increments from the rods 15 which fall between the spaced fingers 18.

Such sliced increments fall to the lower conveyor of a pair of conveyors associated with the first cooking stage. The first cooking stage is comprised of an elongated enclosed oven 20 supported on main frame 21. A lower conveyor 22 extends a substantial distance forwardly of the entrance to oven 20 and is arranged to catch the sliced increments. The upper conveyor 23 has its end closer to the entrance of oven 20 and is arranged to cooperate with conveyor 22 to pass the said increments through oven 20. A pair of rollers 24 and 25 are adjacent the non-conveying or back faces of the respective upper and lower conveyors arranged to press the conveying stretches thereof in close proximity to thereby frictionally engage and flatten said increments and positively hold them as they move through the oven. The conveyors are preferably both made of a silicone or glass impregnated material such as commercially available silicone impregnated cloth or "Teflon" thereby providing a smooth and easily cleaned surface for the increments.

Figure 4:
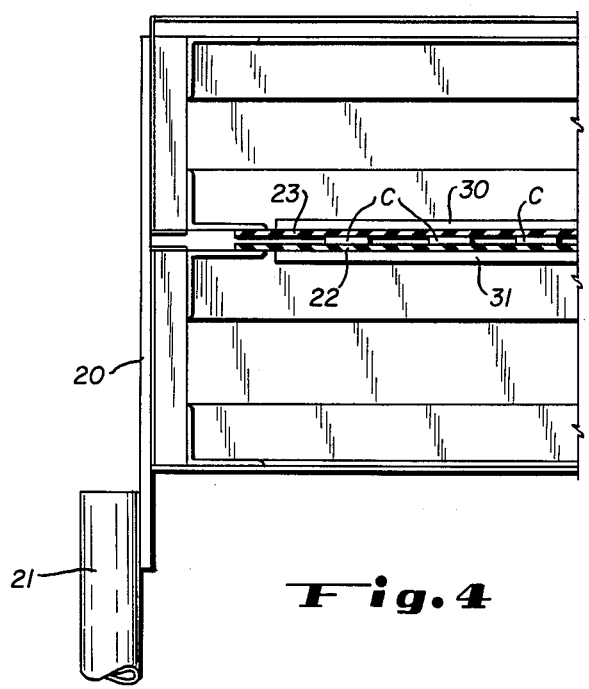
FIG. 4 is a fragmentary end view of the apparatus of FIG. 1 indicating feeding cooperation between conveying stretches of upper and lower conveyors which carry the sliced increments through the initial cooking operation of FIG. 1.

Inside the oven (FIG. 4) a pair of strip heating elements 30 and 31 are positioned adjacent the respective non-conveying faces of conveyors 22 and 23 in order to provide the necessary heat for cooking increments C. The length of the oven is sufficient for the thin increments to have their starch content set-up to thereby impart a self-sustaining, flexible, somewhat rubber-like consistency to the increments.

Adjacent the discharge end of oven 20 is a small roller 35 which is spaced closely adjacent the returning stretch of conveyor 23. Roller 35 rotates in the opposite direction to the travel of conveyor 23 and is arranged to positively remove any flexible increments which have a tendency to stick on that conveyor. Lower conveyor 22 extends a substantial distance beyond the discharge of oven 20 and the roller 35 and is arranged to carry the partially cooked flexible increments C to a downwardly inclined conveyor 36. Adjacent the returning stretch of conveyor 22 and above conveyor 36 is a discharge roller 37 which operates for a purpose similar to roller 35 and is intended to insure that all of the increments are removed from the conveyor 22 and discharged unto conveyor 36.

Figure 5:
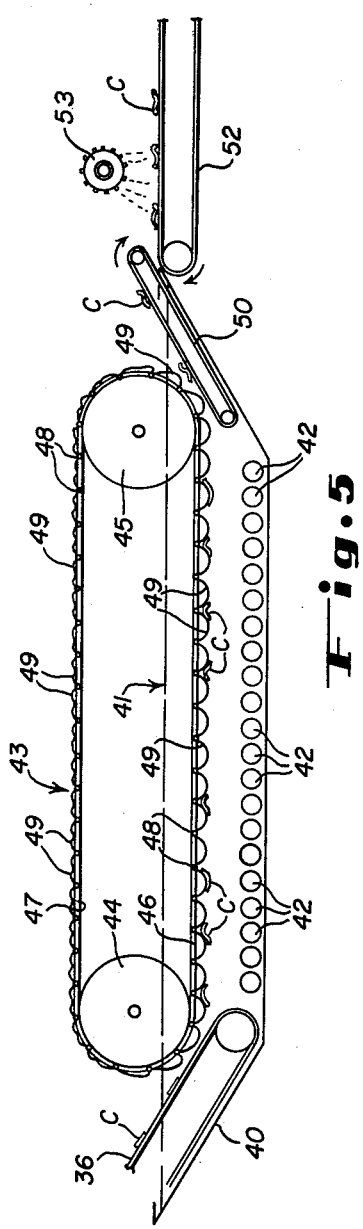
FIG. 5 is a schematic side elevation of an arrangement for the final cooking stage and a salting stage.

Conveyor 36 moves the partially cooked flexible increments into a tank 40 (FIG. 5). Tank 40 encloses the final cooking stage and is filled with cooking oil approximately to the level indicated by reference numeral 41. Spaced along the bottom of tank 40 are a plurality of heaters 42. Preferably these heaters are comprised of elongated tubes having a forced flame passed therethrough.

Above heaters 42 and having its lower stretch below the level 41 of oil is an endless conveying device 43. This conveying device is comprised of a pair of spaced apart rollers 44 and 45 about which is mounted a link belt type, endless conveying stretch 46. Fixed at spaced intervals the entire length of link belt conveying stretch is a flexible wire cloth or belt 47. The wire cloth or belt is attached to the link conveying device by spaced fastening elements 48. The cooperation between fastening elements 48 and the respective portions of wire cloth 47 which they hold is such that a loose pleat 49 of wire cloth remains therebetween. These pleats hang in a natural catenary curve between the respective spaced fastening elements 48 when on a lower or bottom stretch below the surface of oil in tank 40. As a given pleat 49 passes around one of the end rollers 44 or 45 there is a tendency for it to droop, as it were, under the influence of gravity; and similarly, a given pleat passing across the upper stretch tends to sag in the middle.

When the flexible, rubber-like increments C pass from initial cooking in oven 20, conveyor 37 discharges them beneath roller 44 and pleats 49 passing thereby, and under the surface of the oil. Due to the natural buoyancy of these increments in the oil, they tend to float against the catenary curve of pleats 49 and to conform in surface contour thereto. When they have so conformed to the pleats they are carried through the oil bath by the pleats. At the discharge end of tank 40 the increments are completely cooked to a self-sustaining, crisp state. As a given pleat 49 passes around roller 45 it droops, loosening the crisp chips and drops them onto upwardly moving conveyor 50 for discharge onto salting conveyor 52. The salting is accomplished by rotation of apertured salting roller 53 which springles salt onto chips moving on conveyor 51 therebeneath.

The cooked chips are easily packaged in cellophane, clear plastic packages or the like; and because the wavy surface configuration above noted they make attractive and competitive packaging possible, since the wavy surface characteristic imparts an increase in apparent bulk. This is a very desirable adjunct to manufacturers of chips according to my invention since such chip products are normally sold by weight rather than number of chips or volume. Previously, since corn chips have tended to be heavier than potato chips or the like unless there is means by which the apparent mass or bulk and thus volume may be increased they could not be packaged to sell competitively with potato chips or the like even though both packages were of the same weight. My invention allows competitive packaging for given weights.

In a preferred and actual installation, the elongated oven 20 is one the order of fifteen feet, is maintained at about 450° F. during its treatment of the thin sliced increments passing therethrough and has a retention time for the increments of from about 15 to 35 seconds. The actual temperature and retention time vary with ambient conditions of temperature and relative humidity as well as other factors controlled by the consistency and composition of the increments themselves and condition of the conveyor belts.

The final cooking stage is carried out in a tank about twelve feet long containing cooking oil maintained at about 375° F. and the retention time for the flattened rubber-like increments discharging from the oven 20 into the cooking oil until they are cooked to the desired crisp chip product is on the order of about 15 to 35 seconds. The temperature and retention time vary with ambient conditions and other parameters similar to those above discussed relative to the initial cooking in oven 20.

Having thus described my invention in detail and with sufficient particularity as to enable those skilled in the art to practice it, what I desire to have protected by Letters Patent is set forth in the following claims.

I claim:

1. The process of preparing pre-cooked food products from ground grains comprising, initially cooking the ground grain until it is of a mash-like porridge consistency, forming thin increments from the porridge, feeding the increments to an initial dry cooking stage and cooking them therein until they are of a flexible, rubber-like consistency, subjecting these pre-cooked increments to a hot oil bath cooking stage while substantially simultaneously imparting a wavy surface configuration to them, maintaining the wavy surface configuration and continuing cooking of the increments until a crisp, self-sustaining chip product results.

2. The process of preparing pre-cooked chip food products from ground corn comprising, initially cooking the ground corn until it is a porridge-like mush, extruding the mush through a plurality of apertures, removing thin pats from the extruded mush and passing them to an initial cooking stage, cooking the resulting pats in an initial stage until of a flexible, rubber-like consistency, passing said flexible increments to a hot oil bath while substantially simultaneously imparting a wavy surface configuration to them, maintaining the wavy surface configuration and continuing cooking of the increments until a crisp, self-sustaining chip product results.

3. Apparatus for imparting a wavy surface configuration to partially cooked, flexible increments of food material which comprises, a tank containing a quantity of cooking oil and having heating means associated therewith adapted to heat said oil when in said tank, endless belt conveying means mounted across an upper portion of said tank with its lower stretch in said oil and arranged for conveying movement of increments across the tank, said conveying means including a flexible length of material affixed at spaced intervals the extent of the conveying means, there being a loose pleat of said material between said intervals hanging in a natural catenary curve when on the bottom stretch of the conveying means and arranged to move said increments through said oil across the tank.

4. Apparatus for imparting a wavy surface configuration to partially cooked, flexible increments of food material which comprises, a tank containing a quantity of cooking oil and having heating means associated therewith adapted to heat said oil when in said tank, endless belt conveying means mounted across an upper portion of said tank and arranged for conveying movement of increments across the tank, said conveying means including a flexible length of material affixed at spaced intervals the extent of the conveying means, there being a loose pleat of said material between said intervals arranged to hang in a natural catenary curve when on the bottom stretch of the conveying means and arranged to move said increments across the tank, said pleats when in said catenary curve configuration being at least slightly below the upper surface of said contained oil in said tank whereby food material fed into the oil is floated by said oil into conforming relation with said catenary curves and a wavy surface configuration results after a cooking pass through said tank.

5. Apparatus for imparting a wavy surface configuration to partially cooked, flexible increments of food material which comprises, an elongated tank containing a quantity of cooking oil of a predetermined depth and having heating means associated therewith adapted to heat said oil when in said tank, endless belt conveying means mounted across an upper portion of said tank and arranged for conveying movement along the lengthwise axis of the tank, a flexible length of material affixed at equal spaced intervals the extent of the conveying means, there being a loose pleat of said material between said intervals hanging in a natural catenary curve when on the bottom stretch of the conveying means, said pleats when in said catenary curve configuration being at least slightly below the upper surface of contained oil in said tank whereby food material fed into the oil is floated by said oil into conforming relation with said catenary curves and a wavy surface configuration results after a cooking pass through said tank.

6. Apparatus for manufacturing thin, crisp, pre-cooked chips from milled grains comprising, in combination, frame means carrying a pair of endless conveyors having complementary conveying stretches positioned in cooperating conveying relation, means on the frame arranged to pass a plurality of thin increments of partially cooked grain mush to said cooperating stretches, oven means encompassing a major portion of said cooperating stretches to partially cook the increments passing therethrough to a flexible, rubber-like consistency, a tank containing cooking oil mounted adjacent the discharge end of said oven, discharge means cooperating with the discharge end of the oven means for passing the flexible increments beneath the oil surface in said cooking oil tank, conveying means mounted across an upper portion of said tank and arranged for conveying movement thereacross, a flexible length of material affixed at spaced intervals the extent of the conveying means, there being a loose pleat of said material between said intervals hanging in a natural catenary curve when in oil in said tank and adapted to contour the flexible increments and convey them through the oil to discharge means for chip product therefrom.

7. Apparatus for imparting a wavy surface configuration to partially cooked, flexible increments of food material which comprises, a tank containing a quantity of cooking oil and having heating means associated therewith adapted to heat said oil when in said tank, endless belt conveying means mounted across an upper portion of said tank and arranged for conveying movement of increments across the tank, said conveying means including a flexible endless loop of cloth-like material affixed at spaced intervals the extent of the conveying means, there being a loose pleat of said endless loop of cloth-like material between said intervals hanging in a natural catenary curve when on the bottom stretch of the conveying means and arranged to move said increments across the tank, said pleats when in said catenary curve configuration being at least slightly below the upper surface of contained oil in said tank whereby food material fed into the oil is floated by said oil into conforming relation with said catenary curves and a wavy surface configuration results after a cooking pass through said tank.

8. The apparatus of claim 7, in which the cloth-like material is a thin, flexible length of woven wire cloth.

9. Apparatus for manufacturing thin, crisp, pre-cooked chips from milled grains comprising, in combination, frame means carrying a pair of endless conveyors having complementary conveying stretches positioned in cooperating conveying relation, means on the frame for passing a plurality of thin increments of partially cooked grain mush to said cooperating stretches, oven means encompassing a major portion of said cooperating stretches for partially cooking the increments passing therethrough to a flexible, rubber-like consistency, a tank containing cooking oil mounted adjacent the discharge end of said oven, discharge means cooperating with the discharge end of the oven means for passing the flexible increments into said cooking oil tank, conveying means mounted across an upper portion of the tank and arranged for conveying movement thereacross, a flexible length of material affixed at spaced intervals the extent of the conveying means, there being a loose pleat of said material between said intervals hanging in a natural catenary curve when in oil in said tank and adapted to contour the flexible increments and convey them through the oil to discharge chip product therefrom, and means mounted adjacent the discharge from the tank to apply salt to the chip product.

10. The process of preparing pre-cooked chip food products from milled corn comprising, initially cooking the milled corn until a porridge-like mush results, extruding the mush through a plurality of apertures, removing thin pats from the extruded mush and passing them to an initial cooking stage, flattening said pats, cooking the resulting pats in an initial stage until they are of a flexible, rubber-like consistency, removing the flexible increments and passing them to a hot oil bath while substantially simultaneously imparting a wavy surface configuration to them, maintaining the wavy surface configuration and continuing cooking of the increments until a crisp, self-sustaining chip product results.

11. The process of preparing pre-cooked chip food products from milled corn comprising, initially cooking the milled corn until a porridge-like mush results, extruding the mush through a plurality of apertures, removing thin pats from the extruded mush and passing them to an initial cooking stage, flattening said pats, cooking the resulting pats in an initial dry heating stage until they are of a flexible, rubber-like consistency, removing the flexible increments and passing them to a hot oil bath while substantially simultaneously imparting a wavy surface configuration to them, maintaining the wavy surface configuration and continuing cooking of the increments until a crisp, self-sustaining chip product results.

12. The process of preparing from ground grain a pre-cooked wavy-surface chip food product which comprises initially cooking ground grain and water until it is of a mush-like porridge consistency, forming thin pats from said porridge, feeding said pats to an initial dry cooking stage until they are of a flexible rubber-like consistency, subjecting these flexible pre-cooked pats to a hot oil cooking stage and submerging said pats in said hot oil below a conveyor having loose pleats of material suspended in the oil in a series of natural catenary curves so as to impart a wavy configuration to said pats floating thereagainst, cooking said pats in said hot oil until they are crisp self-sustaining chips of a wavy configuration, and then removing the resultant crisp chips from said hot oil.

13. Apparatus for treating increments of mush-like milled grain for subsequent oil cooking into pre-cooked chips comprising in combination: frame means carrying a pair of juxtaposed upper and lower endless belt conveyors, the lower stretch of said upper conveyor and the upper stretch of the lower conveyor being arranged in juxtaposition without intervening structure; feed means including a hopper having an apertured bottom and means for forcing the mush-like milled grain through said apertured bottom, and means for cutting thin increments from the mush-like milled grain forced through the plate so as to deposit the increments on the lower conveyor, said lower conveyor arranged to move the sliced increments from the feeding station into contact with said upper conveyor; roller means on the non-conveying faces of said upper and lower conveyors arranged to force said conveyors into close proximity for flattening the carried increments of mush-like milled grain; oven means encompassing said cooperating stretches for partially cooking the carried increments; and cleaning rollers mounted adjacent the discharge ends of said upper and lower conveyors for removing sticking increments from both said cooperating stretches.

References Cited in the file of this patent
UNITED STATES PATENTS

| | | |
|---|---|---|
| 104,705 | Chambers | June 28, 1870 |
| 1,330,967 | Winters | Feb. 17, 1920 |
| 1,608,840 | Davis | Nov. 30, 1926 |
| 1,919,185 | Chapman | July 25, 1933 |
| 2,083,864 | Puckett | June 15, 1937 |
| 2,807,203 | Buechele | Sept. 24, 1957 |
| 2,882,162 | Holahan | Apr. 14, 1959 |
| 2,905,559 | Anderson | Sept. 22, 1959 |
| 3,020,162 | Cunningham | Feb. 6, 1962 |
| 3,065,079 | Elliott | Nov. 20, 1962 |